D. E. Somes.
Making Ice & Cooling Air & Liquids.
Nº 73936  Patented Jan. 28, 1868.
2 Sheets
Sheet 2
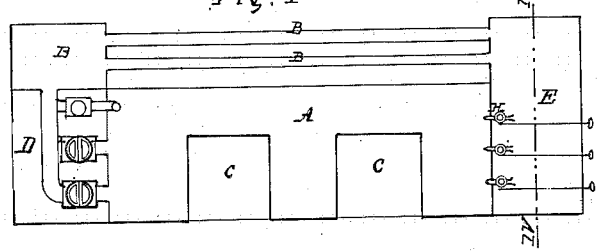
Fig. 1
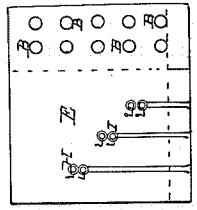
Section IV-IV
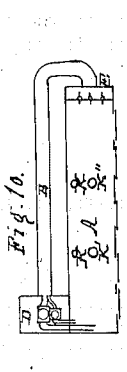
Fig. 10
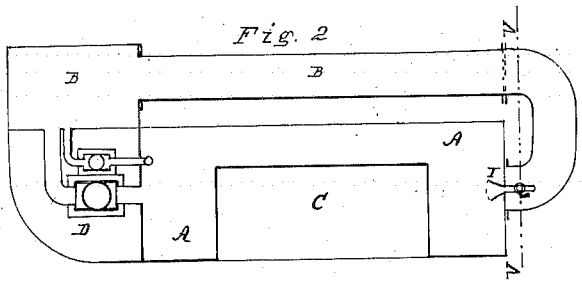
Fig. 2
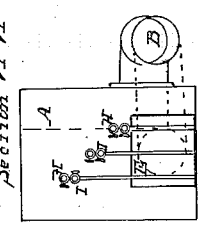
Section V-V
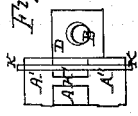
Fig. 9
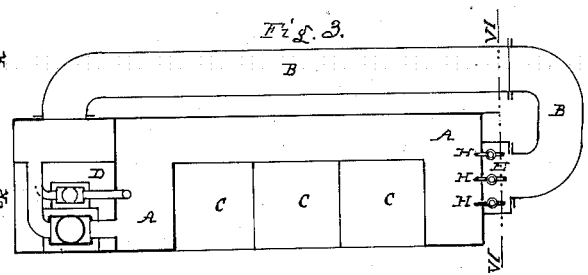
Fig. 3
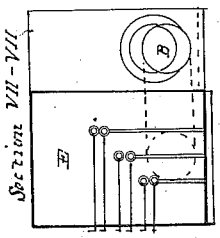
Section VI-VI
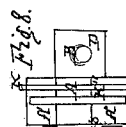
Fig. 8
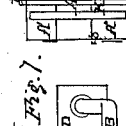
Fig. 7
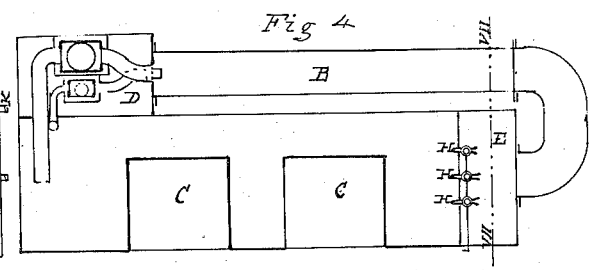
Fig. 4
Section VII-VII
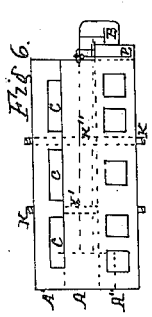
Fig. 6
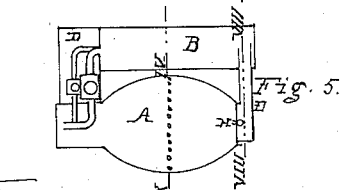
Fig. 5
Section IX-IX
Section VIII-VIII
Witness
F. C. Somes,   D. E. Somes
Charles Noervon

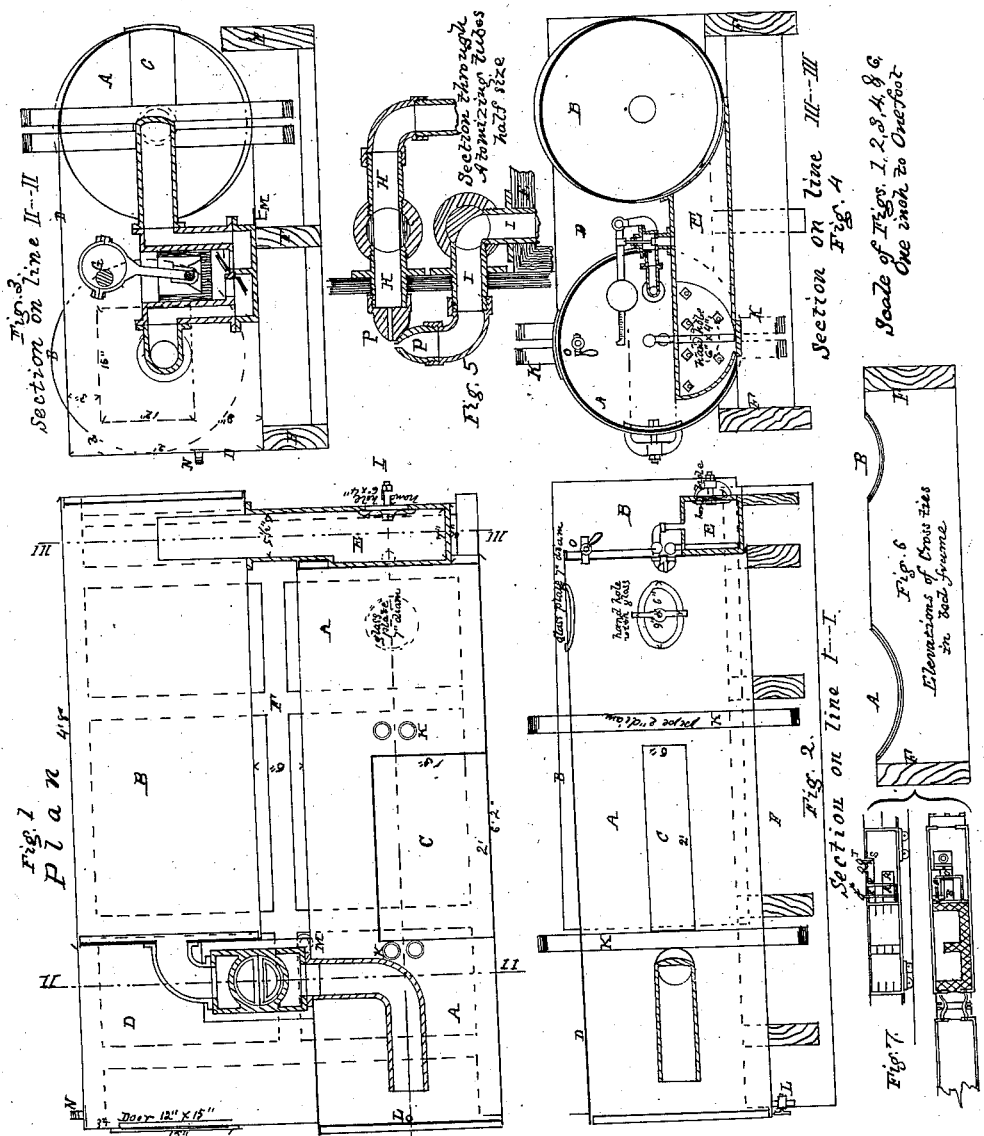
D. E. Somes.
Making Ice & Cooling Air & Liquids.
N° 73936    Patented Jan. 28, 1868.

United States Patent Office.

DANIEL E. SOMES, OF WASHINGTON, DISTRICT OF COLUMBIA.

Letters Patent No. 73,936, dated January 28, 1868.

---

IMPROVED APPARATUS FOR MAKING ICE, AND FOR COOLING AIR AND LIQUIDS.

---

The Schedule referred to in these Letters Patent and making part of the same.

---

TO ALL WHOM IT MAY CONCERN:

Be it known that I, DANIEL E. SOMES, of Washington city, in the District of Columbia, have invented a new and useful Apparatus for Making Ice, and for Cooling Air and Liquids; and I do hereby declare that the following is a full, clear, and exact description thereof, reference being had to the annexed drawings, making part of this specification, in which the figures on sheet marked A are a plan, section, and details of my invention, while on the sheet marked B are plans and sections of different forms and modifications of the same apparatus that is shown on sheet A.

In all the drawings like parts are indicated by the same letters of reference.

On sheet A are shown, in the different figures, two tubes, A and B, of boiler-plate metal, shown as cylindrical, but which may be rectangular, polygonal, elliptic, or any other desirable form, in cross-sections, as circumstances of location or other contingencies may require.

The plates of the tube A need be only as thick as to be able to resist the pressure due to a complete vacuum within the tube, while the tube B should be made of material sufficiently strong to resist the pressure of one hundred pounds to the square inch, more or less, according to the number of atmospheres intended to be forced into it; though five to fifteen pounds, with a vacuum in tube A, will be sufficient to reduce the temperature to a very low point.

Both tubes should be air-tight in all their seams and joints, and in their connections with other parts hereafter to be described. A case, c, is made in the tube A, closed tight on five sides, and open on that side common to it and the tube A. This opening is covered by a door hinged to the tube A, and fitted to shut air-tight.

The vacuum and pressure-tubes A and B are joined at one end to a chamber, D, made strong enough to sustain the pumps and their accompanying apparatus, and should also be air-tight in seams and connections. The other ends of the tubes are joined by the case E, which should be made strong enough to resist an amount of pressure equal to that of tube B. One end of this case E is open, and is connected to tube B in such a manner that any fluid in the latter will run into it while the other end is closed.

Atomizing-pipes H and I connect the interior of this case and the tube B with that of the tube A, having valves or stop-cocks outside of the structure, so as to be operated without having stems or rods to pass through the walls of the case or tubes.

Pipes K K pass through the tubes A and B, being tightly fitted at their junctions with the shells of the tubes, and are fitted to receive conduit-pipes and cocks. A safty-valve, with adjustable weight and graduated lever, is affixed to the case E or tube A, and so arranged that the escape may take place through it from the former and discharge into the latter. A faucet, L, is placed at the lowest point of the bottom of the tube A, and also one at the bottom of the case E, by which any liquid therein may be drawn off.

In the chamber D is placed an air-pump, or as many as may be required, so arranged as to draw from the tube A and discharge into the tube B. Liquid-pumps are also placed in the same chamber, to draw and discharge in the same way as the air-pumps. The connections of the pumps and their pipes or channels with the tubes A and B should be air-tight. The pumps are worked with eccentrics or cranks, and by any convenient power.

In order to prevent any accumulation of heat from the action of the pumps, ice, or ice and salt, or any cooling-mixture may be placed in the chamber D; or an air-pipe may be extended through the vacuum-tube A, to conduct cooled air in and around the pumps and their pipes and channels. Or, instead of the above-described means for cooling the pumps, a supply-pipe, M, may be placed so as to allow a stream of water to flow into the case D, and rise above or near the tops of the cylinders of the pumps, and then pass out an escape-pipe, N. The supply-pipe may run through the tube A, or along the outside of it, when not cold enough to freeze.

Communication is made between the tube A and the chamber D by means of a pipe, with a valve to permit the flow through it of any gas or vapor that may accumulate in the pump-room.

A perforated disk may be used instead of the atomizing-nozzle P, either connected with the pipe I, as constructed, or with a continuous pipe from the liquid-pump, so that compression of air or gases may be dispensed with when desirable.

Around the atomizing-tube I, and the induction-pipes leading to the pumps, is placed a wire gauze, or its equivalent, to prevent any foreign substance from entering the atomizer or the pumps.

Hand-holes, for convenience in repairing, &c., are made in proper places, and closed and fastened in the usual manner. Glass plates are also used at different points, to convey light to the interior of the tubes and chambers.

A cock, O, is inserted in the tube A, to supply air from the outside when it is desirable to force a number of atmospheres into tube B, and also to furnish a medium through which to pour liquids into the tube A.

Figure 7, on sheet A, shows a plan of a railroad-car divided by a partition. In one division may be placed meats, milk, fruits, and other perishable articles, while in the other is placed the cooling-apparatus herein described, and which may be operated by a small engine placed in the same compartment, or in one near it, or by one of the car-wheels or axles properly connected by gears or belts.

A train of cars for the conveyance of passengers or food can be ventilated and cooled by my apparatus. The pipes K, which pass through the tube A, are connected with the tubes or channels running through the cars by means of flexible tubes between the cars, as herein described.

On sheet B are shown different modifications of form and arrangement of my invention, but all operating on the same general principle as that shown on sheet A, and hereinbefore described.

In Figure 2, on sheet B, only one atomizing-tube, I, is shown, which terminates within the tube A, by a "rose" perforated with small holes, through which the liquid is ejected in fine jets by pressure in the tube or in case E.

Figure 5 is a plan of tube A, swelled in the centre to permit the spray to spread to the full extent due to the force with which it is impelled. Within the tube is a coil of pipes for conducting air or liquids through it while being cooled, after which it is conducted to any desirable point. A system of zigzag pipes may be used instead of the coil.

The vacuum and compressing-chambers, as well as the cases, may be made of copper, cast iron, bronze, or composition. They may be cast in sections, with ribs or flanges, and bolted together, and should be galvanized, tinned, or enamelled, to prevent corrosion, when made of iron.

In cooling and ventilating cars, tubes or their equivalents, of sufficient size to conduct ample supply of air for the use of passengers, are extended through the whole length of the cars, with valves to regulate the volume of air or to shut it off altogether. They may run along the sides, top, or bottom of the car, having registers or other openings to permit a free current of air to pass into the car. These tubes or ducts, in the different cars, are connected, by flexible tubes, with couplings or flanges, or some suitable joints, so that the air passing through the pipes K or T may be conducted to any or all the cars in the train, whether such cars are for the transportation of passengers or food or other perishable articles. A water-tank, S, fig. 7, is placed in the car which contains the cooling-apparatus, or in one adjoining it, with pipes leading from it to the outside of the car having on them hoods, or an equivalent device, for directing the air down the pipes. Another set of pipes lead from near the top of the tank, through the vacuum-chamber A, to the store-room, or to the air-ducts running through the cars described above. The lower end of pipe T is above the surface of the water, while that of T' is submerged, whereby the air, in the latter case, is forced through the water and purified of sparks, smoke, dust, &c. These pipes may be set at an angle of forty-five degrees, more or less, in order that a larger volume of air may be conducted to the tank than would be done if they were in a perpendicular position, when the car is in motion. Fig. 7 show lattice-shelves at the sides and ends of the car, to allow a circulation of air among the articles laid upon them. A series of bars or perforated shelves will answer the same purpose. The air-ducts extending through the cars may be made with double or multiple shells, or one may be enclosed within another, with air-spaces or some good non-conductor between them. The flexible tubes may be made in the same way.

Figure 6, sheet B, is an elevation of an improved form of my invention.

Figure 7 is an end elevation.

Figures 8 and 9 are sections respectively on the lines X-X and XI-XI of fig. 6; and Figure 10 is a horizontal section of the same.

The vacuum-chamber in this case is divided into three stories, A A' A'', separated by steam-tight floors. The pressure-chamber or tube B connects with the centre story, A, by means of atomizers and a safety-valve, in the same manner as is already herein described; and the operation of producing a vacuum is conducted in the same manner. The pipes K are made to extend entirely through the three stories, and are fitted with couplings at each end, as hereinbefore described. In figs. 6, 9, and 10, is shown a pipe, K', connecting the story A' with the story A'', but terminating near floors or partitions which separate these stories from the middle one, A, Another pipe, K'', extends from near the top of the story A' nearly to the floor of A'', passing entirely through the intermediate floors. These pipes K' K'' are provided with valves or stop-cocks, not shown, by which they may be closed steam-tight when desirable. A stop-cock is set in the partition or floor between the stories A and A', and another similar stop-cock is placed between A and A'', so that communication may be obtained between the story A and either or both of the others at will. The upper and lower stories have doors fitted to close steam-tight, and of sufficient number to allow access to any part of them. They will also contain pans or other vessels, either movable or otherwise, for the purpose of holding water or other substance to be cooled or frozen, or chemical or other substances for producing cold, and have raised figures on the inside, indicating the number of pounds of ice that each pan will hold.

In the operation of my apparatus, thus modified, a vacuum may be produced in the middle story alone, or in the middle story with either or both of the others, as circumstances may require, by the proper adjustment of the valves or stop-cocks connecting the stories with each other.

By this arrangement I am enabled to use a liquid or chemical of a particular kind in one story, while a different kind is used in the others. For instance, sulphuric acid may be placed in the upper story or the lower one, in one vessel, and water in another, while in the opposite story other chemicals and substances may be used, and in the middle story carbonic acid, ether, or both, or other chemicals, the pumps producing a vacuum in the middle one, and in either or both of the others, according to the adjustment of the valves.

The apparatus herein described, and its modifications, may be cased with black walnut or other suitable material, having, if desired, a space or spaces between the walls for the introduction of any fibrous or other material or substance, as a non-conducting agent to preserve the temperature within the chambers or tubes from being affected by the outside air, or air-tight spaces made between the walls, to contain air only, will do.

I apply my invention to the cooling of liquids, air, and the condensing of vapor or steam; to the cooling of packing-houses, fruit-houses, hospitals, churches, theatres, dwellings, dairies, ships, boats, and other vessels and apartments. Also to freezing water, cream, and other liquids, and to freezing meat, either for salting or other curing, or for transporting it in a frozen state. I also apply my invention to cooling corn, wheat, and other kinds of grain, when stored in granaries, by conducting cooled air through pipes K or T to the different apartments or bins, and also through perforated tubes or channels extending into the mass of grain. I also cool grain in ships, steamboats, canal-boats, and other vessels, in a similar manner. If canal-boats are connected by flexible air-tubes, a long line of them may be cooled by one apparatus or machine, by conducting air through the mass of grain, and around it, as herein described. The boats are constructed with a perforated lining, having a space between it and the walls and bottom of the boat, so that the cooled air, conducted through the tubes of the apparatus, may be admitted not only to the mass of grain through the perforated tubes, but also through the holes in said lining.

Small tanks are placed in some part of the boat or ship, or car or apartment, or wherever cooled air may be introduced through metallic pipes or channels, to catch the "sweat" or liquid accumulated by condensation of vapor or moisture in the air. I use any of the following substances, either singly or in combination, or in compound, in any building, apartment, vessel, car, or other carriages, as a reinforcement of cold in case the machine or apparatus should from any cause cease to operate, namely, ice, ice and salt, or any of the chemicals hereinbefore named, and other cooling or cold substances, with or without salt:

1. Nitrate of potash and hydrochlorate of ammonia, with water.
2. Sulphate of soda, and diluted sulphuric acid.
3. Sulphate of soda, nitrate of potash, diluted nitric acid, and hydrochlorate of ammonia.
4. Diluted nitric acid, and phosphate of soda.
5. Nitrate of ammonia, nitrate of potash, sulphate of soda, and water.
6. Sulphate of soda, and muriatic acid.
7. Muriate of ammonia, and nitrate of potash, with water.
8. Nitrate of ammonia, and crystallized carbonate of soda, with snow-water or ice.
9. Nitrate of ammonia, with water, snow, or ice.
10. Phosphate of soda, and diluted nitric acid, and sulphurous acid.
11. Muriate of ammonia and salt.
12. Muriate of ammonia, nitrate of potassa, and salt, with snow.
13. Common salt and nitrate of ammonia, with water.
14. Muriatic acid, with snow, water, or ice.
15. Potassa and snow, ice, or water.

Ice may be made by my apparatus and stored in the store-room referred to, or in some convenient place near the machine, to be used when and where needed for the reinforcement of cold, as above stated. When the apparatus is in operation, the ice will be prevented from melting, and the said mixtures kept frozen, ready for use.

It will sometimes be found expedient to compress air either before or after being conducted through the tubes K, and to pass it through water or some other liquid under pressure. If the chamber or vessel in which such air is compressed, be surrounded by cold water, ice, or other cold substance, and having good conducting walls, much of the latent heat of the air will be conducted away, and its temperature reduced. When the air is allowed to expand in any given apartment or space, it will become quite cold, without the use of the within-described apparatus or chemicals, but when used in conjunction with these the temperature of such apartment may be reduced to almost any degree of cold.

I intend, therefore, to use any or all of the cooling or freezing-agents or agencies herein named, whether chemical or mechanical, singly or in combination or mixture. The cooling-mixtures or agents may surround the chamber in which the air is compressed, or pipes, or vessels in said chamber, or extending through it, may be filled with them. In cold weather I place steam or hot-water pipes in a car, constructed with double or multiple walls, roof, and floors, as non-conductors, and heat them by steam from the locomotive, or from a boiler arranged for the purpose. Air is let into the room containing the coils of pipe, and heated by them, and then conducted to the different cars through the tubes and channels herein set forth; thus substituting pure, warm air, and thorough ventilation, for the stoves and bad air which endanger the lives and health of the passengers.

The pressure-tube B has a slight slope from the chamber D to the box or case E, which also declines towards the end of tube A, so that any liquid pumped into the tube B will find its way to the lower end of the atomizing-pipe I. The tube A has a fall towards the chamber D, so that liquids in the former may flow around the induction-pipes of the pumps.

The whole structure is mounted on a bed, formed of timber or iron fitted to receive it, and hold it so as not to allow any derangement in the position of the parts. The frame is designated by the letter F. Fig. 6 shows the different curves in the cross-ties of a timber bed, for the reception of the tubes A and B, to suit their slopes in contrary directions.

In the operation of my apparatus, I place in the tube A or B, or case E, ammonia, ether, alcohol, hydrocarbon, sulphurous acid, chloroform, naphtha, benzine, chlorine, oil or spirits of turpentine, anhydrous acid, sulphuric acid, carbonic acid, water, vinegar, steam, or any of the articles or compounds hereinafter named, singly or in compound, or combination, or any other volatile liquid or substance. When the liquid or gas intended to be used has been confined within one of the tubes A or B, or case E, the pumps are set in motion, drawing the air and liquid from tube A and forcing them into tube B.

By opening the cock O, the vacuum-chamber A may be resupplied with air, so that any number of atmospheres can be compressed within the tube B, which number will be limited by the action of the safety-valve, and a uniform pressure preserved by the same. The liquid pumped into the tube B is forced up the atomizing-pipe I by the pressure in said tube, and drawn up by the jet of air forced through the pipe H, and dispersed, in the form of spray, within the vacuum-tube. By this means air or liquid passing through the pipes K may be cooled and conducted to a lower chamber, or to any point or place below the machine, by its own gravity, or to rooms or chambers above by means of blowing-engines, or their equivalents, for cooling or fanning-purposes, or both, and cream, water, or other substance placed in the case c, may be cooled or frozen.

The liquid, air, or gas thus forced into the tube A, is again pumped into the tube B, and the process of cooling and freezing is continued so long as the pumps are kept in motion without waste of material.

In cooling and ventilating hospitals and other buildings, pipes are connected with the pipes K, terminating in each apartment, and provided with valves or registers, so that by opening one of these, any degree of temperature may be secured in any one department, while the temperature in others may be higher or lower, being regulated in the same way. Proper openings for the escape of foul air should be provided in each apartment, and in cars and vessels, so that a constant change of air, as well as any desired degree of temperature, may be secured.

In the erection of all public and private buildings, elaborate methods are adopted for the protection of the occupants against the severity of winter weather. And in the more costly edifices a large expenditure is incurred and great ingenuity is displayed in the construction of furnaces and other apparatus for heating, and the vast outlay for fuel to promote comfort and preserve health is submitted to as a necessity. By means of artificial heat the temperature of dwellings is mitigated about forty degrees, on the average, in the northern States, during the winter months. But while so much is done toward alleviating the rigors of winter, no system has been adopted for shielding our houses, or churches, or hospitals from the furnace-like breath of summer. People flee to the woods and mountains to escape the "fiery darts" of July and August, and woo the cooling breezes, which, in their occasional coming, are welcome as odors from "Araby the blest." Yet, by the adoption of my invention, the suffocating, enervating, and unhealthful heat of midsummer might be replaced by a cool, refreshing, and salubrious atmosphere. If to those in health, the sultry summer days are oppressive and debilitating, how much more suffering they bring to those who are languishing on beds of sickness.

Having thus fully described my invention, what I claim, and desire to secure by Letters Patent, is—

1. The bed-frame, as and for the purpose set forth.
2. Atomizing liquids, substantially as shown in fig. 2.
3. Connecting cars or boats, and other vessels, as and for the purpose set forth.
4. Cooling cars, for the transportation of meats and other food, substantially as set forth.
5. Cooling and ventilating passenger-cars, substantially as set forth.
6. Cooling ships, boats, and other vessels, as described.
7. Cooling corn, wheat, and other kinds of grain, in canal-boats and other vessels, substantially as set forth.
8. Cooling grain in granaries and other buildings, substantially as set forth.
9. Using ice and other cooling or freezing-substances, in combination with a machine or machinery for producing cold, and as an alternative or reinforcement of cold, when such machine or machinery shall from any cause cease to operate, for the purposes herein set forth.
10. Making ice and freezing cream, as herein described.
11. Cooling liquids and condensing steam, gases, or vapor, substantially as set forth.
12. Purifying air and cooling it, substantially as and for the purposes set forth.
13. Cooling or freezing meats, fish, fruits, and other kinds of food, substantially as described.
14. Cooling or freezing meats, vegetables, or other food, by means of machinery, in combination with chemical agents.
15. Cooling cars, by means of a machine or machinery.
16. A car, having in it or connected with it, a machine or machinery for cooling or freezing, as an article of manufacture.
17. The apparatus herein described, or its equivalent, as an article of manufacture.
18. Canal-boats and other vessels, with linings and tubes, substantially as described, in combination with the apparatus herein described.
19. Flexible air-tubes, for connecting cars or boats, and other vessels.
20. Canal-boats, with tubes for conducting cooled air, and means for ventilating, and the apparatus, or an equivalent, for cooling or freezing, substantially as described.

D. E. SOMES.

Witnesses:
  F. C. SOMES,
  CHARLES HERRON.